United States Patent
Saito et al.

(10) Patent No.: US 7,243,359 B2
(45) Date of Patent: Jul. 10, 2007

(54) METHOD AND APPARATUS FOR DYNAMICALLY ABSORBING VIBRATION

(75) Inventors: Toshio Saito, Fukuchiyama (JP); Hiroshi Ohyama, Fukuchiyama (JP)

(73) Assignee: Yamauchi Corporation, Osaka (JP)

( * ) Notice: Subject to any disclaimer, the term of this patent is extended or adjusted under 35 U.S.C. 154(b) by 110 days.

(21) Appl. No.: 10/519,795

(22) PCT Filed: Nov. 21, 2003

(86) PCT No.: PCT/JP03/14957

§ 371 (c)(1),
(2), (4) Date: Dec. 27, 2004

(87) PCT Pub. No.: WO2004/051661

PCT Pub. Date: Jun. 17, 2004

(65) Prior Publication Data

US 2005/0174896 A1    Aug. 11, 2005

(30) Foreign Application Priority Data

Nov. 29, 2002  (JP)  ............................. 2002-347144
Oct. 27, 2003  (JP)  ............................. 2003-366247

(51) Int. Cl.
*G11B 7/08*  (2006.01)

(52) U.S. Cl. ........................................... 720/692

(58) Field of Classification Search ................ 720/692, 720/693; 369/249.1, 263.1; 360/97.02
See application file for complete search history.

(56) References Cited

U.S. PATENT DOCUMENTS

| 6,125,097 | A | * | 9/2000 | Wu | .......................... 720/692 |
| 6,646,977 | B2 | * | 11/2003 | Chen et al. | ................. 720/692 |
| 2002/0085478 | A1 | | 7/2002 | Park et al. | |
| 2003/0012120 | A1 | * | 1/2003 | Chen et al. | ................. 369/247 |

FOREIGN PATENT DOCUMENTS

| CN | 200380103885.8 | 12/2006 |
| JP | 6-129488 | 5/1994 |
| JP | 2001-256762 | 9/2001 |
| JP | 2001-355670 | 12/2001 |
| JP | 2002-093115 | 3/2002 |
| KR | 2002-37846 | 5/2002 |
| TW | 540798 | 7/2003 |

* cited by examiner

*Primary Examiner*—David Davis
(74) *Attorney, Agent, or Firm*—Ditthavong Mori & Steiner, P.C.

(57) ABSTRACT

A disk device (10) comprises a case (11) for supporting the entire disk device (10), a base chassis (12) on which a spindle motor (21) for rotating the disk is set, a counterweight (13) for absorbing vibration of the base chassis (12), and a plurality of elastic bodies (14a-14d) for mutually supporting the case (11), the base chassis (12) and the counterweight (13). The case (11), the base chassis (12), and the counterweight (13) are supported by the common elastic bodies (14a-14d). As a result, there can be provided the dynamic vibration absorber in which the number of parts is not increased and a cost can be reduced, and the optical disk device (10) using the dynamic vibration absorber.

5 Claims, 5 Drawing Sheets (A)

(B)

unit:mm

|  | DIMENSION B | DEMENSION C | DIMENSION (B-A)/2 |
|---|---|---|---|
| COUNTERWEIGHT | φ6 | 1.5 |  |
| 5500rpm | φ6 | 1.5 | 1.25 |
| 8000rpm | φ6.1 | 1.5 | 1.8 |

METHOD AND APPARATUS FOR DYNAMICALLY ABSORBING VIBRATION

TECHNICAL FIELD

The present invention relates to a dynamic vibration absorber, an optical disk device using it, and a method of determining a corresponding vibration frequency of the dynamic vibration absorber and more particularly, it relates to a dynamic vibration absorber having a simple constitution, an optical disk device using it, and a method of determining a corresponding vibration frequency of the dynamic vibration absorber.

BACKGROUND ART

A conventional dynamic vibration absorber for an optical disk is disclosed in Japanese Unexamined Patent Publication No. 2001-256762 and Japanese Unexamined Patent Publication No. 2001-355670, for example. FIG. 4 is a schematic view showing a simplified constitution of an essential part of the optical disk devices disclosed in Japanese Unexamined Patent Publication No. 2001-256762 and Japanese Unexamined Patent Publication No. 2001-355670.

According to the conventional optical disk device shown in FIG. 4, a spindle motor for rotating a disk, a head for reading information on the disk and the like are mounted on a base chassis 52 and the base chassis 52 is mounted on a main chassis (a case serving as a base) 51 through elastic bodies 53.

Recently, since the number of rotations of the disk has increased, a dynamic vibration absorber needs to be provided in order to avoid vibration generated because of the increased of the number of rotations. In this case, a counterweight 55 for absorbing the vibration generated because of the rotation of the spindle motor is mounted on the base chassis 52 through elastic bodies 54$a$ and 54$b$.

Since the conventional dynamic vibration absorber and the optical disk device using it are constituted as described above, when the dynamic vibration absorber is mounted on the base chassis, one to four elastic bodies are needed, depending on a configuration of the dynamic vibration absorber. As a result, the number of parts is increased when the dynamic vibration absorber is mounted, so that a cost is increased.

DISCLOSURE OF INVENTION

It is an object of the present invention to provide a dynamic vibration absorber in which the number of parts is decreased and a cost can be reduced.

It is another object of the present invention to provide an optical disk device using a dynamic vibration absorber in which the number of parts is not increased and a cost can be reduced.

It is still another object of the present invention to provide a method of determining a corresponding vibration frequency of a dynamic vibration absorber.

According to a dynamic vibration absorber of an optical disk device of the present invention, a base chassis for holding a motor is mounted on a case of the optical disk device through a first elastic body. The dynamic vibration absorber comprises a second elastic body for supporting a counterweight constituting the dynamic vibration absorber on the base chassis, and the second elastic body is integrally formed with the first elastic body.

Since the second elastic body for supporting the counterweight on the base chassis is integrally formed with the first elastic body for supporting the base chassis on the case, they are not separately provided like in the conventional one.

Since the number of elastic bodies can be reduced, there can be provided the dynamic vibration absorber whose cost can be reduced because the number of parts is decreased.

According to another aspect of the present invention, an optical disk device comprises the above dynamic vibration absorber.

Since the optical disk device comprises the above dynamic vibration absorber, the number of elastic bodies can be reduced in the optical disk device.

As a result, there can be provided the optical disk device in which the number of parts is decreased and a cost is reduced.

Preferably, an elastic coefficient of the first elastic body is lower than an elastic coefficient of the second elastic body.

Since the integrated elastic body can be constituted by two regions having different elastic coefficients, a desired elasticity can be provided in each region. Since appropriate elastic coefficient can be provided for each region, a desired function as the dynamic vibration absorber can be provided.

Another aspect of the present invention relates to a method of determining a vibration frequency of a dynamic vibration absorber for an optical disk device. A base chassis for holding a motor is mounted on a case of the optical disk device through a first elastic body, and a second elastic body for supporting a counterweight constituting the dynamic vibration absorber on the base chassis is provided. The second elastic body and the first elastic body are integrally formed. The vibration frequency of the dynamic vibration absorber for the optical disk device is determined by adjusting at least one of an outer diameter and a thickness of the second elastic body.

BEST MODE FOR CARRYING OUT THE INVENTION

Figure 1:
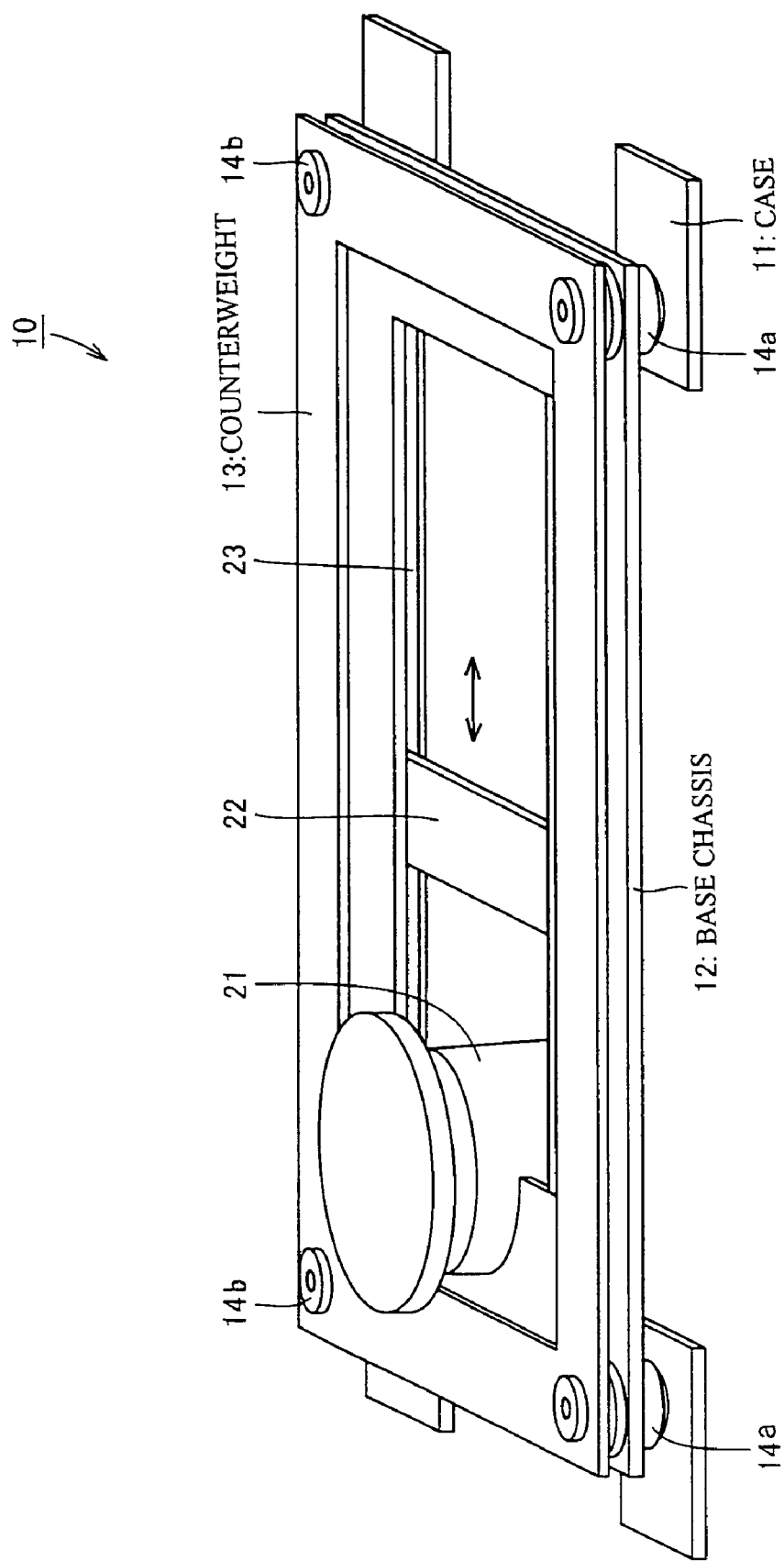
FIG. 1 is a perspective view showing an essential part of an optical disk device using one example of a dynamic vibration absorber according to the present invention.

Hereinafter, a description is made of an embodiment of the present invention with reference to the drawings. FIG. 1 is a perspective view showing one embodiment of a dynamic vibration absorber and an optical disk device using it according to the present invention.

Referring to FIG. 1, an optical disk device 10 comprises a case 11 (only a part of the case serving as a base is shown in FIG. 1), a base chassis 12 and a counterweight 13 which are mounted on the case 11 at four points through elastic bodies 14.

A spindle motor 21 for rotating a disk (not shown) is provided on the base chassis 12, and an optical pickup (not shown) for reading data from the disk is mounted on an optical pickup holder 22.

The optical pickup holder 22 is reciprocated along a guide 23 in the directions shown by arrows in FIG. 1.

Figure 2:
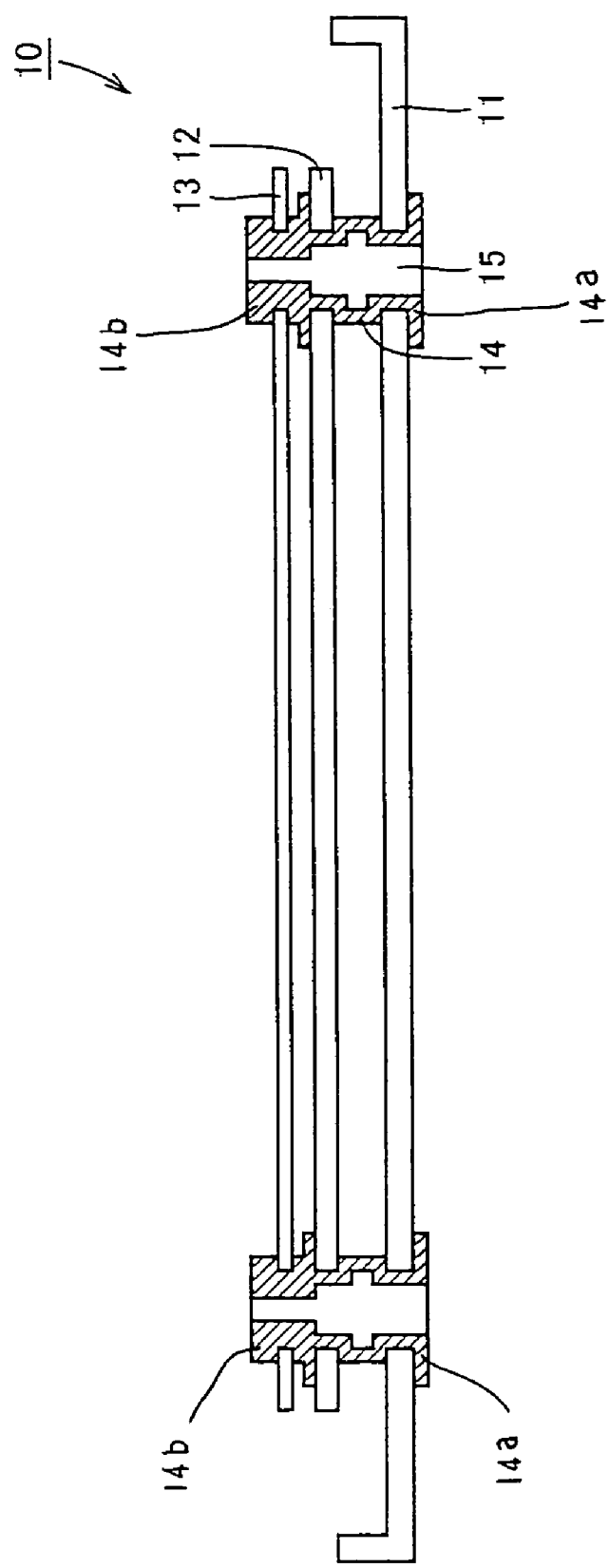
FIG. 2 is a sectional view showing an essential part of the optical disk device using one example of the dynamic vibration absorber in FIG. 1 according to the present invention.
Figure 4:
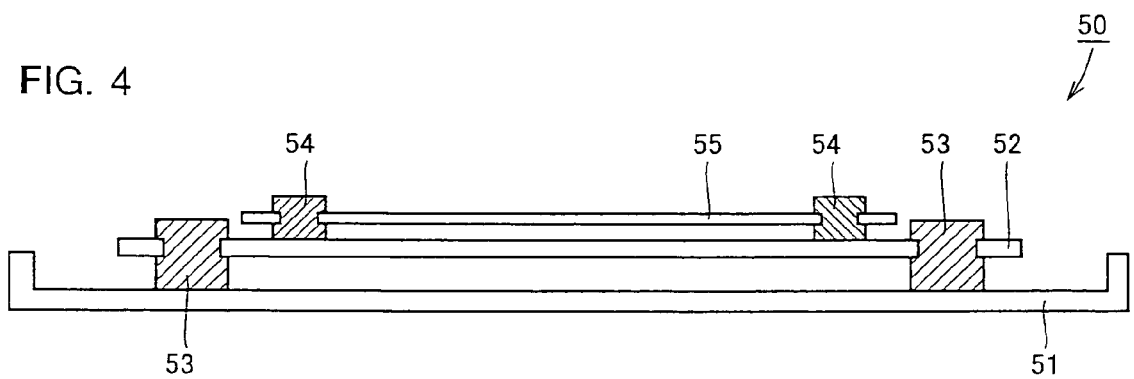
FIG. 4 is a sectional view showing the essential part of the optical disk device having the conventional dynamic vibration absorber.

FIG. 2 is a schematic view showing an essential part of the optical disk device 10 shown in FIG. 1, which corresponds to the conventional optical disk shown in FIG. 4.

Referring to FIGS. 1 and 2, the optical disk device 10 using the dynamic vibration absorber according to this embodiment has the base chassis 12 and the counterweight 13 mounted on the case 11 through unitary elastic bodies 14. Since the base chassis 12 and the counterweight 13 are supported by the unitary elastic bodies 14, the number of parts can be decreased.

Here, the dynamic vibration absorber comprises the counterweight 13 and the unitary elastic bodies 14.

Figure 3:
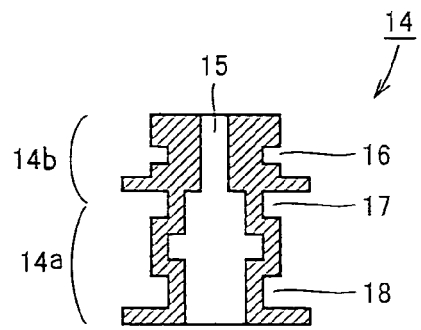
FIG. 3 is a sectional view showing an elastic body for supporting a counterweight.

Next, one of the elastic bodies 14 used in this embodiment is described. FIG. 3 is a sectional view showing a concrete configuration of the elastic body 14 shown in FIG. 2.

Referring to FIG. 3, the elastic body 14 comprises a hole 15 through which a screw and the like passes, a counterweight support part 16 for supporting the counterweight 13, a base chassis support part 17 for supporting the base chassis 12, and a case support part 18 for supporting the case 11.

The elastic body 14 consists of an upper part 14$b$ and a lower part 14$a$ which are made of the same material and connected by the base chassis support part 17 into a single body. A thickness of the upper part 14$b$ is greater than that of the lower part 14$a$ and therefore, their elastic coefficients are different even if they are made of the same material. That is, when it is assumed that the elastic coefficient of the lower part 14$a$ is k1 and the elastic coefficient of the upper part is k2, it is provided that k1 <k2.

The elastic coefficient is set as follows. That is, the spindle motor 21 for rotating the disk is mounted on the base chassis 12, and the base chassis 12 is supported by the lower part 14$a$ of the elastic body 14 having the elastic coefficient k1. Meanwhile, vibration force caused by eccentric rotation of the disk is applied to the base chassis 12. Mass of the counterweight 13 and the elastic body upper part 14$b$ and the elastic coefficient k2 are set so as to match the vibration frequency of this vibration force. Thus, the base chassis 12 and the counterweight 13 are supported by the elastic bodies formed of the same material, and the vibration can be effectively prevented.

As a material used in the elastic body, any material can be used if it satisfies the above condition, and for example, even the material constituting the elastic body 54 which supports the counterweight 55 on the base chassis 52 in the conventional example shown in FIG. 4 may be used.

Although the description was made of the case where all of the four elastic bodies 14 supported by the case 11 support the base chassis 12 and the counterweight 13 in this embodiment, the present invention is not limited to this and only one or any number out of four may support them as long as the elastic coefficient can be selected so as to match the above vibration frequency.

Although the description was made of the case where the number of elastic bodies 14 supported by the case 11 is four in this embodiment, the present invention is not limited to this number, and it may be three or any number of elastic bodies to be supported.

In addition, as the elastic body 14, a thermosetting elastic body (rubber) may be used or a thermoplastic elastic body (thermoplastic elastomer) may be used. More specifically, as the thermosetting elastic body (rubber), there are natural rubber, butadiene rubber, styrene-butadiene rubber, acrylonitrile-butadiene rubber, isoprene rubber, chloroprene rubber, butyl rubber, butyl halide rubber, ethylene propylene rubber, chlorosulfonated polyethylene, chlorinated polyethylene, acrylic rubber, fluorocarbon rubber, polyurethane rubber, silicon rubber and the like.

As the thermoplastic elastic body (thermoplastic elastomer), styrene block copolymer, and thermoplastic elastomer of olefin, polyester, polyurethane, vinyl chloride, polyamide and the like can be used.

Although the description was made of the case where only the elastic body is used in this embodiment, the present invention is not limited to this and an attenuator may be additionally used together.

Although the upper part and the lower part of the elastic body are made of the same material in this embodiment, the present invention is not limited to this and they may be made of different materials. For example, materials having different elastic coefficients may be used, materials having different coefficients of loss may be used, and materials having different elastic coefficients and coefficients of loss may be combined. As a method of forming them, any method such as coinjection molding (integral molding) and bonding of upper and lower parts of a damper may be used as long as the function is maintained.

Although the description was made of the case where the base chassis is provided on the case and the counterweight is provided thereon in this embodiment, the present invention is not limited to this and the case, the counterweight and the base chassis may be in any positional relation.

Figure 5:
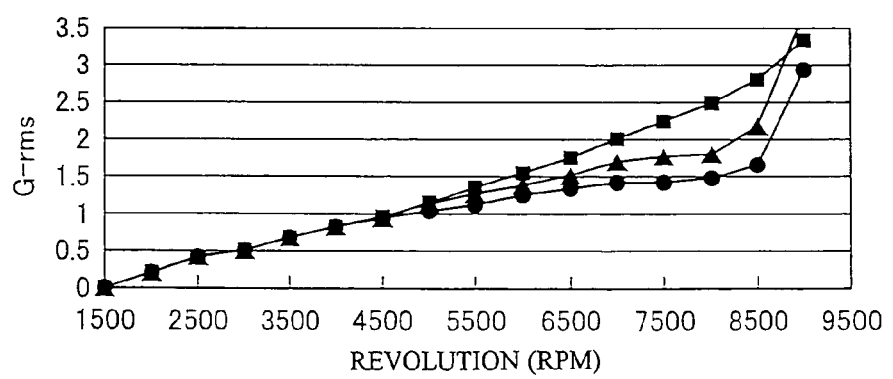
FIG. 5 is a view showing a comparative example of absorption performance of the conventional separate type of dynamic vibration absorber and an integral type of dynamic vibration absorber when the dynamic vibration absorbers are horizontally set.

Next, a description is made of data regarding performance of the dynamic vibration absorber according to one embodiment of the present invention. FIG. 5 is a graph showing the vibration absorption performance of the dynamic vibration absorber set horizontally as one of the experimental examples in which the conventional separate type of dynamic vibration absorber comprising two separate elastic bodies, one for mounting the base chassis on the main chassis, and the other for mounting the counterweight, is compared with the integral type of dynamic vibration absorber according to the present invention. The lateral axis. designates the number of rotations per minute (RPM) and the vertical axis designates a degree of vibration by G-rms (root-mean-square acceleration).

The conventional separate type of dynamic vibration absorber has the. elastic body (elastic body 53 in FIG. 4) made of a butyl rubber for supporting the base chassis and the elastic body (elastic body 54 in FIG. 4) made of a silicon rubber for supporting the counterweight. The integral type of dynamic vibration absorber of the present invention has the elastic body (elastic body 14 in FIG. 1) made of a silicon rubber.

FIG. 5 shows the measured self-vibration amounts of the separate type (shown by ▲ in the drawing) and the integral type (shown by ● in the drawing), both of which use the same counterweight and an unbalance disk is mounted thereon (1 g-cm). In addition, data (shown by ■ in the drawing) of a dynamic vibration absorber, which uses no elastic body and is fixed directly to the base chassis, is shown as a comparative example.

As can be seen from FIG. 5, a difference between the integral type as one embodiment of the present invention and the separate type is generated from about 5000rpm and performance of the dynamic vibration absorption of the integral type becomes greater than those of the other types as the number of revolutions is increased.

Figure 6:
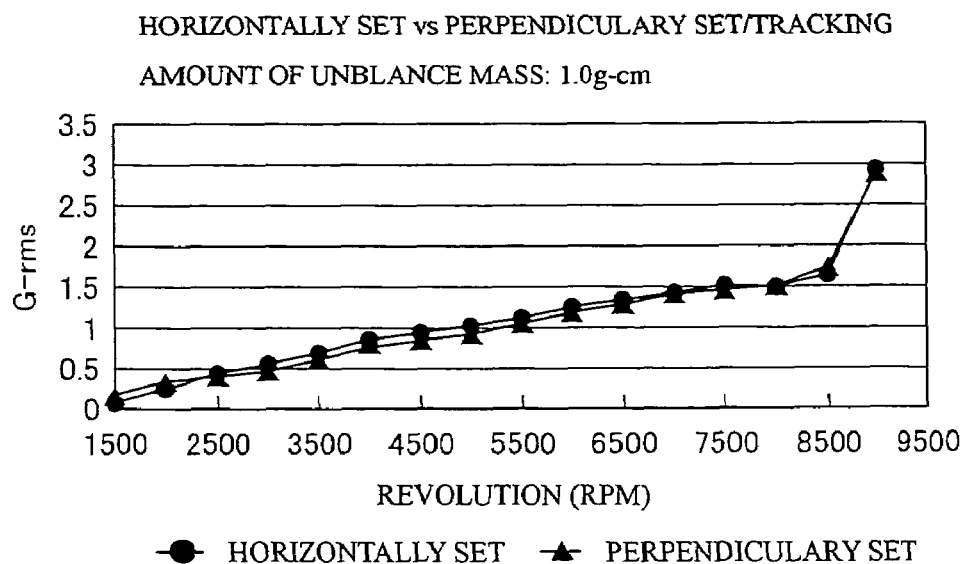
FIG. 6 is a view showing G-rm vs. Revolution Per Minute (RPM) in a case where the dynamic vibration absorber is vertically set and a case where the dynamic vibration absorber is horizontally set.

FIG. 6 is a graph showing a comparison example between the case where the dynamic vibration absorber is set vertically and the case where the dynamic vibration absorber is set horizontally. Similar to FIG. 5, the lateral and vertical axes designate the number of rotations and the degree of vibration (G-rms), respectively.

As can be seen from FIG. 6, the same effect of vibration suppression can be provided in the case of horizontal setting (shown by ● in the drawing) and in the case of vertical setting (shown by ▲ in the drawing).

Figure 7:
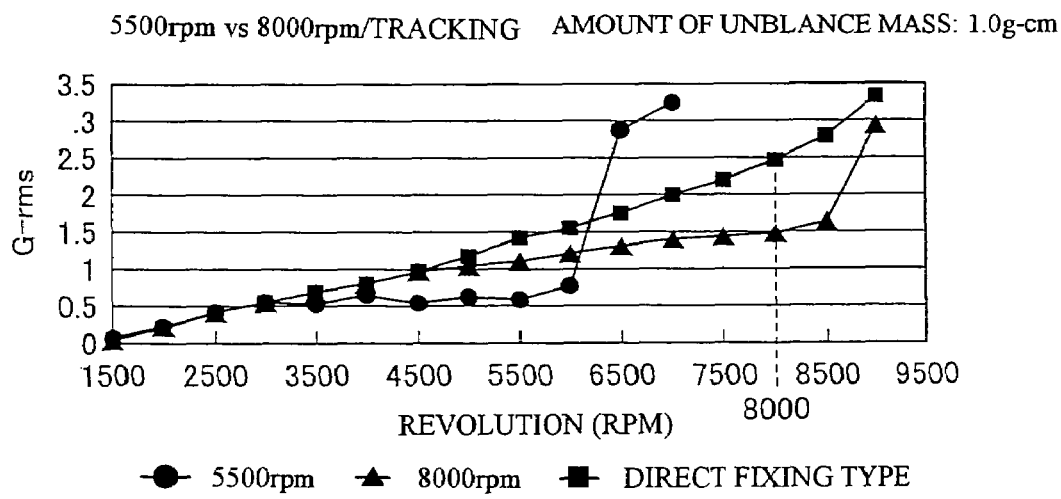
FIG. 7 is a view showing an effect when a configuration of the elastic body for supporting the counterweight is changed.

FIG. 7 is a graph showing an effect when a configuration of the elastic body for supporting the counterweight is changed.

Figure 8:
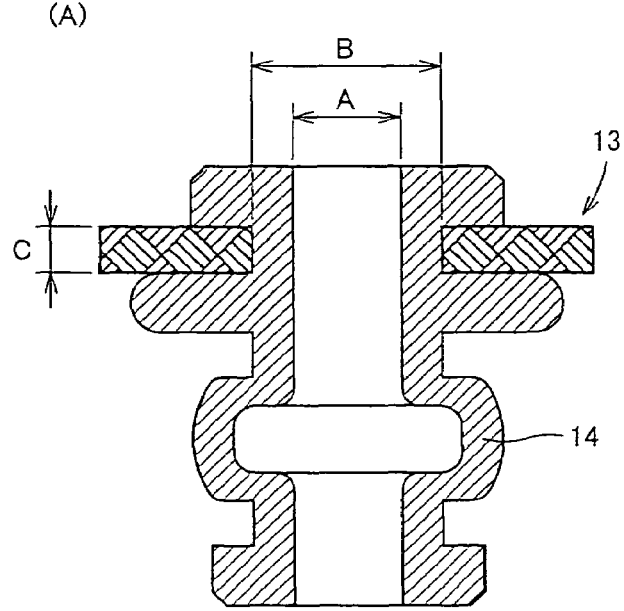
FIG. 8 is a view showing a configuration of an elastic body for supporting the counterweight.

It is a graph showing the vibration absorption performance of the dynamic vibration absorber when an outer cylinder diameter (a dimension B) and a thickness (a dimension (B–A)/2) of the cylinder of the elastic body 14 at a part for supporting the counterweight 13 shown in FIG. 8 are changed.

Similar to. FIGS. 5 and 6, the lateral and vertical axes designate the number of rotations per minute and the degree of vibration (G-rms), respectively.

Referring to FIG. 7, in both cases of 8000rpm (shown by ▲ in the drawing) and 5500rpm (shown by ● in the drawing), the absorption performance designed for each specification is given. Thus, it is found that a range of the number of rotations per minute in which the effect of the dynamic vibration absorber can be achieved can be adjusted by appropriately setting the dimension even when the same material is used. In addition, the data (shown by ■ in the drawing) of the directly fixed absorber without using a damper is shown as a comparative example.

Although the example in which a desired absorption performance is obtained by changing both the outer diameter and the thickness of the elastic body 14 is shown in this embodiment, the desired absorption performance can be provided by adjusting at least one of the outer diameter and the thickness of the elastic body 14.

Although one embodiment of the present invention is described with reference to the drawings, the present invention is not limited to the above illustrated embodiments. Various modifications may be made within the same or equivalent scope of the present invention. Examples are shown below.

1. A dynamic vibration absorber used in an optical disk device, wherein a base chassis on which a drive motor is set, a case for supporting the base chassis and a counterweight constituting the dynamic vibration absorber are supported through a single elastic body.

2. An optical disk device comprising a case for supporting the entire optical disk device, a base chassis on which a motor for rotating an optical disk is set, a counterweight for absorbing vibration of the base chassis, and a plurality of elastic bodies for supporting the case and the base chassis, and the base chassis and the counterweight, wherein at least one of the plurality of elastic bodies supports the case, the base chassis, and the counterweight as a single elastic body.

INDUSTRIAL APPLICABILITY

Since the second elastic body for supporting the counterweight on the base chassis is integrated with the first elastic body for supporting the base chassis on the case, it can be effectively used in the optical disk device.

The invention claimed is:

1. A dynamic vibration absorber for an optical disk device, comprising:
   a base chassis for holding a motor is mounted on a case of said optical disk device-through a first elastic body, and
   a second elastic body for supporting a counterweight constituting said dynamic vibration absorber on said base chassis,
   wherein said second elastic body is integrally formed with said first elastic body into a single body.

2. The optical disk device comprising the dynamic vibration absorber according to claim 1.

3. The optical disk device according to claim 2, wherein an elastic coefficient of said first elastic body is lower than an elastic coefficient of said second elastic body.

4. A method of determining a vibration frequency of a dynamic vibration absorber for an optical disk device, having:
   a base chassis for holding a motor is mounted on a case of said optical disk device through a first elastic body, and
   a second elastic body for supporting a counterweight constituting said dynamic vibration absorber on said base chassis,
   wherein said second elastic body is integrally formed with said first elastic body into a single body, comprising the steps of;
   adjusting at least one of an outer diameter and a thickness of said second elastic body; and determining a vibration frequency of said dynamic vibration absorber corresponding to the adjusted at least one of said outer diameter and the thickness of said second elastic body.

5. The dynamic vibration absorber according to claim 1, wherein said first elastic body and said second elastic body comprise either the same or different thermosetting elastic rubber or thermoplastic elastomer materials.

* * * * *